(12) United States Patent
McDonald (10) Patent No.: US 6,510,820 B1
(45) Date of Patent: Jan. 28, 2003

(54) COMPARTMENTED GAS FLUE FOR $NO_x$ CONTROL AND PARTICULATE REMOVAL

(75) Inventor: Dennis K. McDonald, Massillon, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 10/055,317

(22) Filed: Jan. 23, 2002

(51) Int. Cl.$^7$ .................................................. F01N 3/10
(52) U.S. Cl. ..................... 122/155.1; 122/4 D; 110/345; 422/173
(58) Field of Search .................... 122/1 B, 4 D, 122/135.1, 155.1, 459; 165/104.16; 110/245, 345; 422/168, 173, 180

(56) References Cited

U.S. PATENT DOCUMENTS

| | | |
|---|---|---|
| 4,286,548 A | 9/1981 | Brash |
| 4,950,473 A | 8/1990 | Flockenhaus et al. |
| 5,437,851 A | 8/1995 | MacInnis |
| 5,529,093 A | 6/1996 | Gallagher et al. |
| 5,618,499 A | 4/1997 | Lewis et al. |
| 5,762,107 A | 6/1998 | Laws |
| 5,809,912 A * | 9/1998 | Hansen et al. ............... 122/4 D |
| 5,943,865 A * | 8/1999 | Cohen ......................... 110/345 |
| 6,074,619 A | 6/2000 | Schoubye |

OTHER PUBLICATIONS

*Steam*, Its Generation and Use, 40th Edition, The Babcock & Wilcox Company, ©1992, p. 18–16 to 18–17, p. 34–4 to 34–8.

Kitto, "Air Pollution Control for Industrial Boiler Systems," ABMA Industrial Boiler Systems conference, Nov. 6–7, 1996, West Palm Beach, Fl, p. 5–6.

Tonn et al., "2200 MW SCR Installation on New Coal–Fired Project," Institute of Clean Air Companies (ICAC) Forum '98, Mar. 18–20, 1998, Durham, NC, p. 2–4.

Rogers et al., "Perspectives on Ammonia Injection and Gaseous Static Mixing in SCR Retrofit Applications," EPRI– DOE–EPA Combined Utility Air Pollutant Control Symposium, Aug. 16–20, 1999, Atlanta, GA, p. 1–5.

Signer, "Mixing and Flow Conditioning in Front of a Catalyst Bed for a SCR Process," 2001 Conference on Selective Catalytic Reduction (SCR) and Selective Non–Catalytic Reduction (SNCR) for NOx Control, May 16–18, 2001, Pittsburgh, PA.

Nischt et al., "Recent SCR Retrofit Experience on Coal–Fired Boilers," POWER–GEN International '99, Nov. 30–Dec.2, 1999, New Orleans, LA, p. 1–11.

MacLaughlin et al., "Selective Catalytic Reduction (SCR) Retrofit at San Diego Gas & Electric Company South Bay Generating Station," EPRI–DOE–EPA Combined Utility Air Pollutant Control Symposium, Aug. 25–29, 1997, Washington, D.C., p. 3–4.

* cited by examiner

*Primary Examiner*—Gregory Wilson
(74) *Attorney, Agent, or Firm*—Kathryn W. Grant; Eric Marich (57) ABSTRACT

A flue for improving gas flow characteristics is used to supply a flue gas flow with particulate material entrained therein to a selective catalytic reduction reactor. Conduits have an inlet for receiving the gas flow and an outlet for emitting the gas flow. Compartments are disposed adjacent the conduits. Each compartment has an intake end positioned in flow communication with the conduit outlet and a discharge end for discharging the gas flow proximate the selective catalyst reduction reactor. The intake end of the compartment and the outlet end of the conduit are positioned on the same horizontal plane. A device supplies ammonia into the gas flow.

22 Claims, 6 Drawing Sheets

COMPARTMENTED GAS FLUE FOR NO$_x$ CONTROL AND PARTICULATE REMOVAL

FIELD AND BACKGROUND OF INVENTION

The present invention relates generally to the field of industrial and utility boilers and in particular to a new and useful compartmented exhaust gas flue for control of NO$_x$ emission via a selective catalytic reduction (SCR) system.

Figure 1:
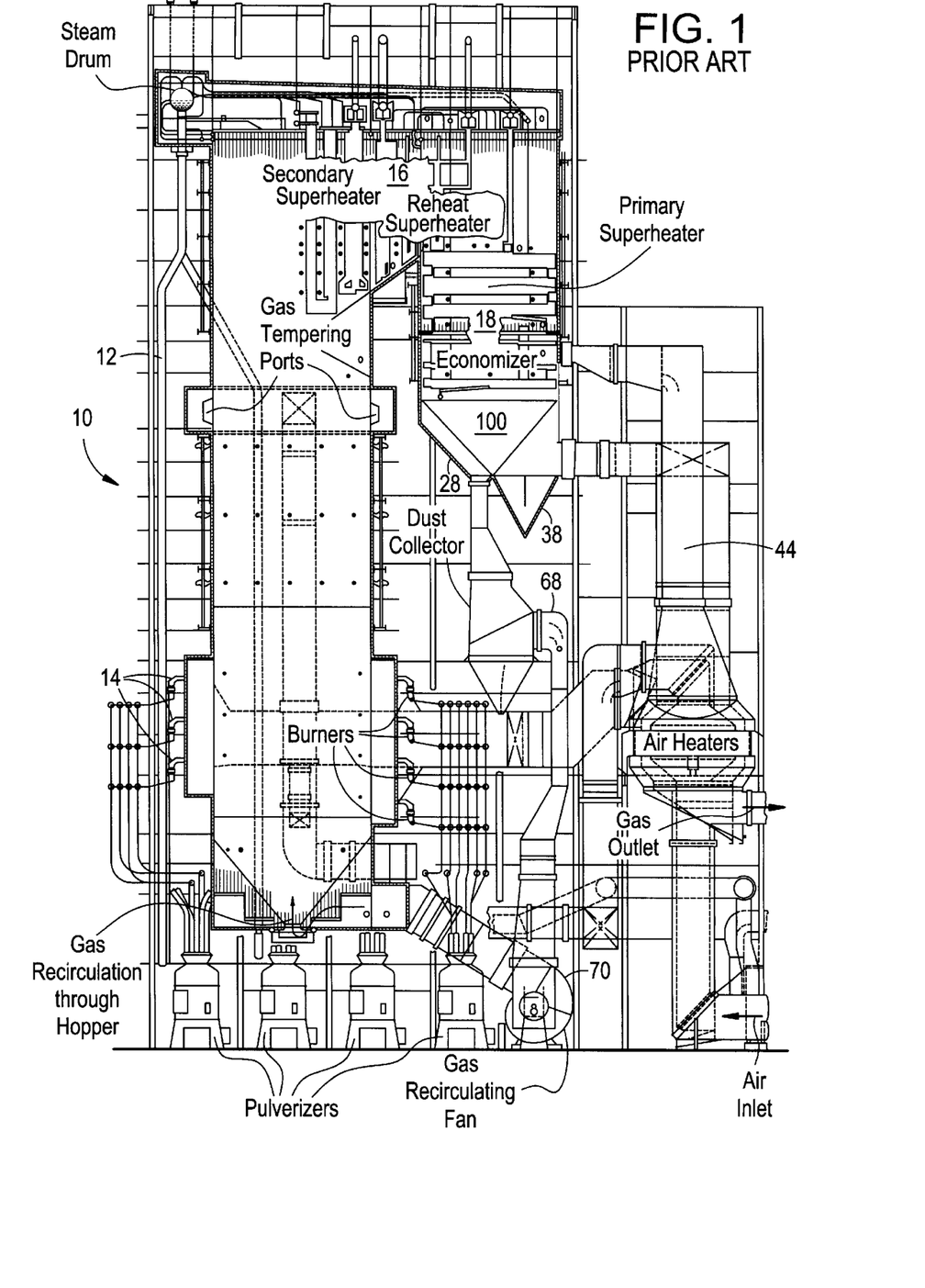
FIG. 1 is a schematic side elevation view of a utility boiler where the present invention may be used.

FIG. 1 is a schematic view of a pulverized coal (P.C.) fired boiler 10. The walls of the boiler 10 are lined with tubes 12. A fluid (usually water) is circulated through the tubes 12. As the water flows through the tubes 12, it absorbs the heat generated within the boiler 10 by heat radiation and/or heat convection. Pulverized coal is fed to the burners 14 wherein the fuel burns in the presence of previously introduced combustion air. The resulting flue or exhaust gas, comprised of heated gases and the combustion by-products, pass upwardly through the boiler 10 in heat exchange relationship with the tubes 12, through horizontal convection pass 16 and finally through vertical gas pass 18 before ultimately exiting from the boiler 10. A major portion of the flue gas is then routed to an air heater via main exit gas conduit 44 before it is discharged into a stack (not shown). If necessary, the flue gas may be passed through various types of pollution control equipment (not shown) as well.

As shown in FIG. 1, many utility boilers have a boiler outlet flue 100, located below the convection pass, which directs the flowing flue gas through a 90 degree turn as it leaves the boiler. Hoppers at the bottom of the flue collect some, albeit limited, amount of the particulate before it reaches downstream pollution control equipment, such as NOx removal equipment.

A design which has been used for the purpose of controlling boiler outlet steam temperature over a wide range of load conditions is to withdraw, a portion of the flue gas, called recirculated gas, from the exiting flue gas stream and returned to the boiler 10. The recirculated gas is a small portion of total flue gas flow, typically less than 20%. Recirculation of the flue gas is accomplished by gas recirculation apparatus 28 and the associated recirculation conduit 68. A fan 70 is employed to induce recirculation flow.

Figure 2:
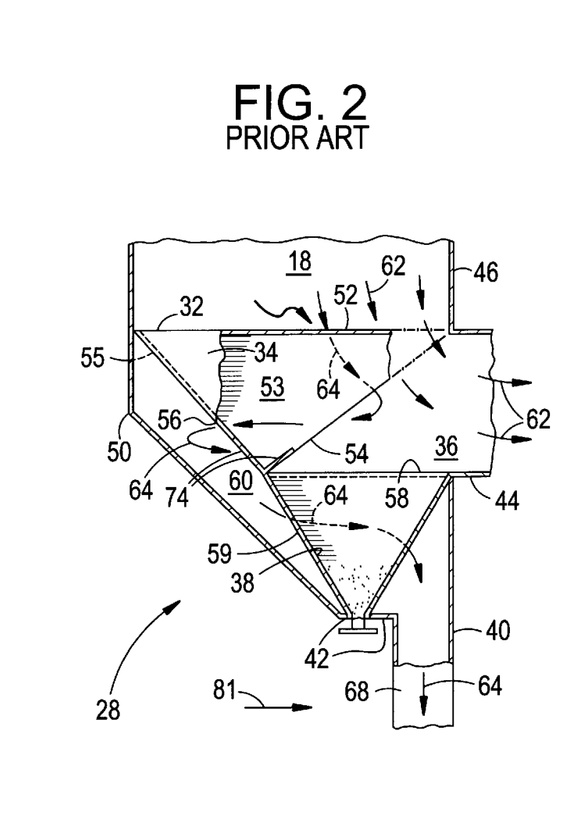
FIG. 2 is a side view of a known gas recirculation apparatus, used to recirculate part of the flue gas stream back to boiler.
Figure 3:
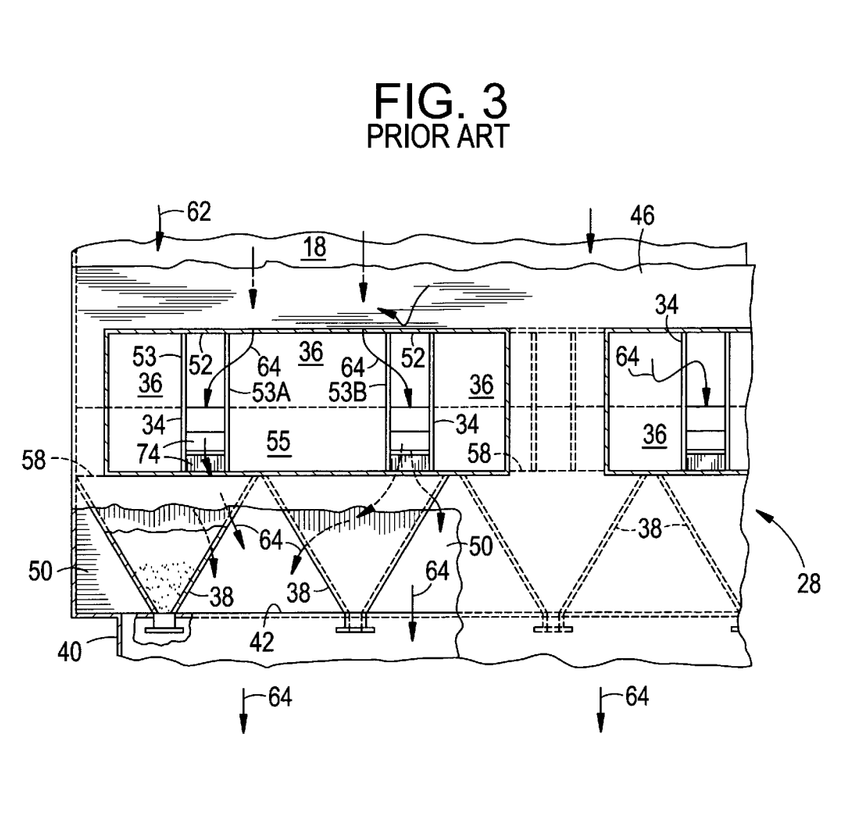
FIG. 3 is a front view, partially cut away, of a known gas recirculation apparatus, used to recirculate part of the flue gas stream back to boiler.

FIGS. 2 and 3 illustrate a known gas recirculation apparatus 28, which is used to recirculate part of the flue gas stream back to boiler, as taught in U.S. Pat. No. 4,286,548 to Leslie O. Brash and assigned to The Babcock & Wilcox Company. Arrow 81 indicates the direction of the front of the apparatus 28. The upper face 32 of the apparatus 28 is partially open and in flow communication with the vertical gas pass 18. A plurality of triangular-shaped hollow flow channels 34 divide the upper portion of the apparatus 28 into a multiplicity of discrete flow passages 36.

Flow passage 36 is defined by the side walls 53 of adjacent flow channels (see for example 53a and 53b) and inclined plate member 55. Member 55 is rectangular in shape and is obliquely situated, occupying plane 56. Plate member 55 urges most of the flue gas to make a 90 degree turn toward the front of apparatus 28, thereby exiting through conduit 44. Much of the particulate entrained in the flue gas precipitates out onto plate 55 during this turn and slides down member 55 into ash hopper 38. Member 55 is located on both sides of flow channel 34.

The typical flow channel 34 is a hollow box, shaped like a triangle, disposed so that the triangle peak is pointing downward. The base 52 of channel 34 is a solid rectangular-shaped member extending from the back to the front of pass 18. The vertical sides 53 of channel 34 are solid, triangular-shaped members, whose peaks point downward and whose oblique edges define planes 54 and 56. There are no side members occupying planes 54 and 56, thereby giving channel 34 its hollow nature.

While the flow channels themselves are hollow, having no members in either plane 54 or 56, planes 54 and 56 are partially occupied by inclined plates 74.

Inclined plates 74 provide support for the flow channels and, depending upon the length of plate 74 in planes 54 and 56, provide a degree of control over the flow of gas through the flow channels.

Disposed below flow channels 34, but not necessarily in alignment therewith, are a series of ash hoppers 38. Normally closed, means are provided (not shown) to empty the hoppers 38 of collected particulate matter at periodic intervals. The upper faces 58 of the hoppers 38 are open. The oblique faces of hopper 38, of which face 59 is typical, are closed.

Situated adjacent to and in front of the hopper 38 is recirculation duct 40. The front side of duct 40 extends from the bottom of conduit 44 downward where it joins conduit 68. The back side of duct 40 extends from the bottom face 42 of apparatus 28 downward where it joins conduit 68. Duct 40 is in flow communication with conduit 68.

Main exit gas conduit 44, in flow communication with passages 36, extends outwardly from the front face 46 of the apparatus 28, providing egress for the bulk of the flue gas, i.e. the gas not being recirculated.

The back face 50 of apparatus 28 is composed of an upper portion and a lower portion. The upper portion is a vertically disposed member which extends downward from and in the same plane as the back of vertical gas pass 18. The lower portion of back face 50 is a member extending obliquely from the bottom of the upper portion of back face 50 to bottom face 42. Back face 50, bottom face 42, back face 59 and member 55 define flow space 60.

The only way in which the gas may enter flow space 60 is via flow channel 34. The sides of plate member 55 are sealably attached to the side walls 53 of adjacent flow channels. The bottom edge of member 55 is sealably attached to the upper edge of back face 59 of the ash hoppers, the upper edges of adjacent hoppers being sealably attached to one another. Therefore, the only available route to flow space 60 is through flow channels 34.

The apparatus 28 is designed to provide a serpentine flow passage for the recirculated gas, represented by flow line 64. The recirculated gas, after coming down pass 18, undergoes an initial turn of approximately 90 degrees as it turns to flow from the area between adjacent channels toward flow channel 34. This first turn is best illustrated in FIG. 3. The recirculated gas then makes a second 90 degree turn as the gas turns to flow through channel 34. This second turn is best illustrated in FIG. 2. These turns, due to the effects of gravity and the inertia of the particulate matter, cause a large portion of the particulate matter to drop into ash hoppers 38.

Most of the flue gas coming down pass 18 will follow the path of least resistance which means it will turn to pass through conduit 44. This flow is indicated by flow line 62. While this gas is not recirculated, the change in flow direction causes particulate matter from the main flue gas stream to drop into hopper 38. This gas, after exiting apparatus 28 via conduit 44, is destined to be discharged to a stack (not shown).

The recirculated gas, after moving through channel 34 toward the rear of apparatus 28, enters flow space 60.

Rebounding off back face 50, the recirculated gas turns roughly 180 degrees and moves toward the front of apparatus 28. Passing along both sides of hoppers 38, the gas moves forward until it reaches duct 40. At this point the direction of flow changes 90 degrees as the gas moves vertically down duct 40. From duct 40, the recirculated gas enters conduit 68, passes therethrough to dust collector 72, and from there will eventually be introduced to boiler 10, hence completing the circuit.

Nothing in the art described above teaches or suggests the use of a structure for controlling boiler outlet steam temperature as a means to improve a NOx removal system using selective catalytic reduction (SCR).

Serving a purpose entirely different from the gas recirculating apparatus described above, SCR systems are used to clean impurities from the exhaust gases from boilers, and in particular, to reduce $NO_x$ emissions. $NO_x$ refers to the cumulative emissions of nitric oxide (NO), nitrogen dioxide ($NO_2$) and trace quantities of other species generated during combustion of fossil fuel in boilers and furnaces. Conversion of molecular and fuel nitrogen into $NO_x$ is promoted by high temperatures and high volumetric heat release rates found in boilers.

In an SCR system, ammonia is injected into the boiler exhaust gas stream in the presence of a catalyst. A chemical reaction occurs with the exhaust gases which removes a large portion of $NO_x$ from the exhaust gases and converts it to water and elemental nitrogen.

As the catalysts used in SCR systems are carefully engineered and expensive, it is beneficial to be able to control the stoichiometry of the exhaust gas/ammonia/catalyst reaction. Ammonia is typically introduced using sparger tubes to spray ammonia into the exhaust gas stream. The sparger tubes form an ammonia injection grid (AIG).

An ammonia injection grid design presently in use has multiple levels of sparger tubes having spray openings. The openings are oriented parallel with the exhaust gas flow, toward the catalyst. Groupings of the tubes are supplied by independently controlled supply headers to create zones within the grid. The zones encompass multiple levels across the grid.

Current consensus with respect to the operation of SCR's is to provide the highest level of flow with temperature and chemical component uniformity. Techniques such as zonal AIG injection, static mixing and judicious use of flow correcting devices have all been employed in known SCR designs to attempt to provide the most uniform flow and blend composition as practical. However, these techniques still do not provide a perfectly uniform flow or blend, so that improvement is possible.

The optimal operating temperature of an SCR system depends upon the specific catalyst, but is usually in the range of 450 to 840° F. In a coal-fired boiler, the most common location for the SCR system is therefore between the economizer outlet and the air heater, where the flue gas temperature usually falls within this temperature window. This arrangement places the SCR system upstream of the dust collectors and flue gas desulfurization systems. Due to the high dust loading associated with coal firing, this arrangement therefore exposes the catalyst to dust-laden flue gas. High temperature dust removal is difficult and expensive. Designing the SCR system with vertical downward flue gas flow helps to minimize the effects of particulate exposure, however, the particles in the flue gas can still erode the fragile catalyst surfaces, and can cause blinding of the catalyst, thereby reducing the amount of exposed surface and diminishing its effectiveness. Catalyst erosion is caused by the impingement of flyash on the catalyst face, and is primarily due to poor flow and ash distribution. Catalyst erosion is a function of gas velocity and can be reduced to some extent by limiting the linear velocity of the flue gas stream, e.g. to less than 20 ft/sec, but this may not be a complete solution, and can require the additional expense of adding more flow area for the flue gas in order to drop the velocity.

In view of the above, a gas flue for a coal-fired boiler which improves distribution of ammonia injected into flue gas for NOx control, and also provides additional particulate removal upstream of an SCR system to reduce catalyst degradation and provide longer catalyst life is needed.

SUMMARY OF INVENTION

It is therefore an object of the present invention to improve distribution of ammonia into the exhaust gas stream upstream of an SCR.

A still further object of the present invention is to provide a device for reducing the amount of particulate material entering an SCR.

It is a further object of the present invention is to provide a device for improving the distribution of ammonia into the exhaust gas stream and reducing the amount of particulate material entering an SCR, and which does not require significant additional space for the installation of more ductwork outside the existing flues and can therefore be retrofit to existing utility boilers with a minimum of modification, and which minimizes system pressure loss.

Accordingly, a plurality of compartments are provided within the gas outlet flue of a boiler. The flue gas flows vertically downward along the compartments. Each compartment is composed of plate work blocking the upstream (top) face, front and sides of the compartment. This configuration forces the flue gases to flow around the compartment and enter from the downstream (bottom) face which is open. As the flue gas enters the downstream (bottom) face, it is forced to reverse flow direction causing much of the particulate to fall into the ash hoppers below. The flue gas is then forced to make a 90 degree turn to flow horizontally out of the open rear face at the boiler exit and is routed into the SCR. If necessary, hotter flue gases can be introduced to maintain proper temperature for the SCR at low boiler loads. Ammonia is injected into the flue gas, preferably in controlled amounts.

In one embodiment of the invention, a flue is provided having improved gas flow characteristics for supplying a flue gas flow with particulate material entrained therein to a selective catalytic reduction reactor. The flue comprises a plurality of conduits and a plurality of compartments. Each conduit has an inlet for receiving the flue gas flow and an outlet for emitting the flue gas flow. Each compartment is adjacent at least one of the plurality of conduits, and has an intake end positioned in flow communication with the outlet of the adjacent conduit. The intake end of each compartment and the outlet end of each conduit are positioned on the same horizontal plane. The flue has means for supplying ammonia into flue gas flow and a discharge end for discharging the flue gas flow proximate the selective catalytic reduction reactor. Hoppers are disposed at the bottom of the flue for collecting particulate material entrained in the gas.

In another embodiment of the invention, a flue is provided having improved flue gas flow characteristics for supplying a flue gas flow with particulate material entrained therein to a selective catalytic reduction reactor. The flue comprises a plurality of conduits and a plurality of compartments. Each conduit has an inlet for receiving the flue gas flow and an outlet for emitting the flue gas flow, with the inlet and the outlet of each conduit having the same longitudinal axis. Each compartment is located adjacent at least one of the plurality of conduits. Each compartment is trapezoidal in shape and has a rectangular cross sectional flow area. Each compartment further has an intake end positioned in flow communication with and on the same horizontal plane as the outlet of the adjacent conduit, and has a discharge end for discharging the flue gas flow proximate the selective catalytic reduction reactor. The intake end of each compartment and the discharge end of each compartment are oriented generally perpendicular to one another. The conduits and compartments each have approximately the same cross sectional flow area. The flue has means for supplying ammonia into flue gas flow and means for measuring NOx concentration within at least one compartment. Hoppers are disposed at the bottom of the flue for collecting particulate material entrained in the gas.

In yet another embodiment, a method is provided for improving the gas flow characteristics of a flue gas flow supplied to a selective catalytic reduction reactor and having particulate material entrained therein. The method comprises providing a plurality of conduits, with each conduit having an inlet for receiving the flue gas flow and an outlet for emitting the flue gas flow. The inlet and the outlet of each conduit have the same longitudinal axis. A plurality of compartments, are also provided, with each compartment located adjacent at least one of the plurality of conduits. Each compartment is trapezoidal in shape, has a rectangular cross sectional flow area, and has an intake end positioned in flow communication with and on the same horizontal plane as the outlet of the adjacent conduit. Each compartment has a discharge end for discharging the flue gas flow proximate the selective catalytic reduction reactor, with the intake end of each compartment and the discharge end of each compartment being oriented generally perpendicular to one another. Each conduit and each compartment have approximately the same cross sectional flow area. The method further includes measuring NOx concentration within at least one compartment, and supplying ammonia into the flue gas flow in response to the NOx concentration measured within at least one compartment. The method employs hoppers disposed at the bottom of the flue for collecting particulate material entrained in the gas.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 5:
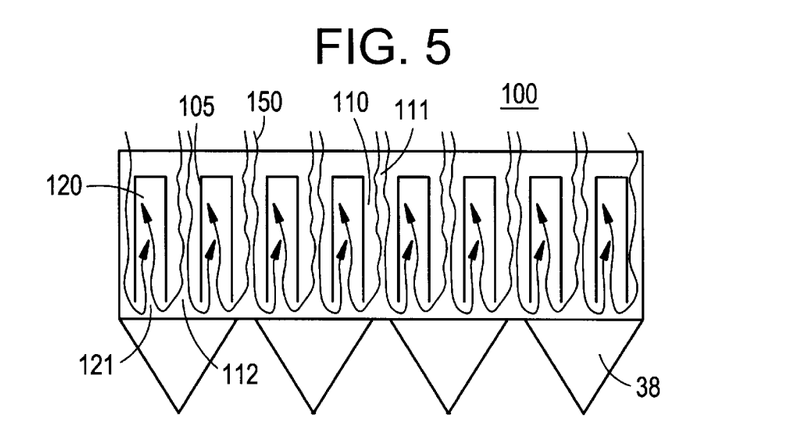
FIG. 5 is a rear elevation view of a boiler outlet flue having a compartmented flow path for an SCR according to an embodiment of the invention wherein ammonia is injected into the compartments.
Figure 8:
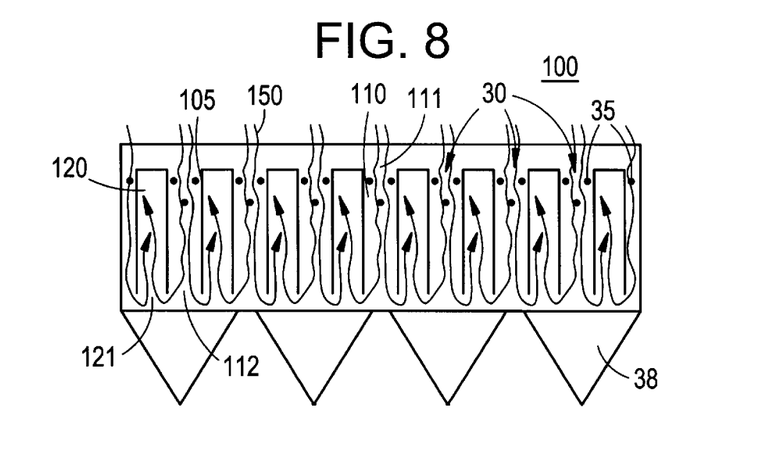
FIG. 8 is a rear elevation view of a boiler outlet flue having a compartmented flow path for an SCR according to an embodiment of the invention wherein ammonia is injected into the conduits between the compartments.
Figure 11:
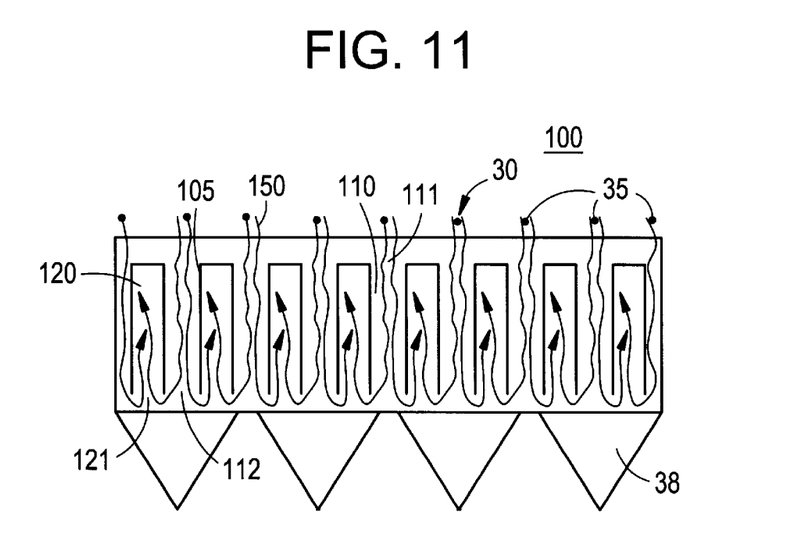
FIG. 11 is a rear elevation view of a boiler outlet flue having a compartmented flow path for an SCR according to an embodiment of the invention wherein ammonia is injected into the flue gas stream upstream of the compartments.
Figure 12:
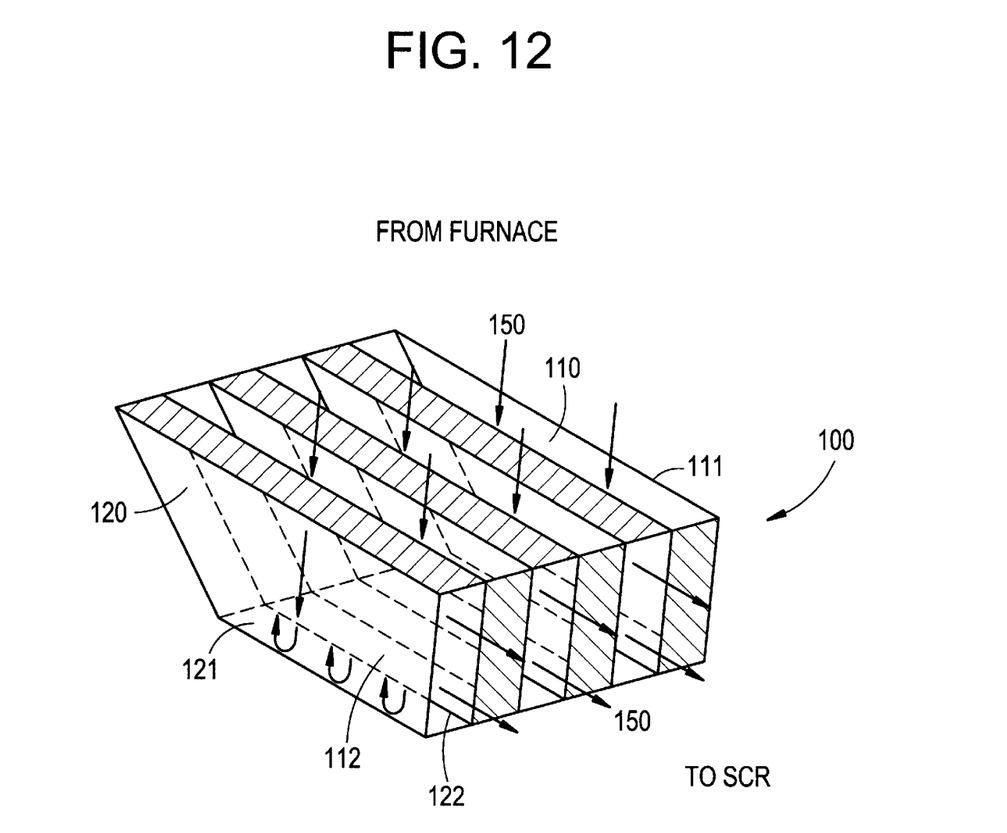
FIG. 12 is a perspective schematic view of a flue having a compartmented flow path for an SCR according to the invention.

Referring now to the drawings, in which like reference numerals are used to refer to the same or similar elements, FIGS. 5, 8 and 11 show compartments 120 formed inside boiler outlet flue 100 between conduits 110. Each conduit has inlet 111 for receiving and segmenting flowing flue gas 150 from the boiler and outlet 112 for directing flowing flue gas 150 toward compartments 120. In a first preferred embodiment, inlet 111 and outlet 112 of conduit 110 have the same vertical axis.

Compartments 120 and conduits 110 are in flow communication with one another. Compartments 120 have an intake end 121 for receiving and segmenting gas flow from conduits 110, and discharge end 122 for discharging flowing flue gas 150 toward SCR reactor catalyst bed 170 along discrete flow paths. Inlet 121 and outlet 122 of compartment 120 are preferably oriented perpendicular from one another. Outlet 112 of conduit 110 and intake end 121 of compartment 120 are oriented on the same horizontal plane. Conduits 110 and compartments 120 are disposed adjacent one another, preferably side-by-side in alternating sequence.

Barrier wall 105 is vertically disposed between each adjacent conduit 110 and compartment 120.

All of the flue gas which enters the boiler outlet flue 100, i.e. entering via the inlets 111 of conduits 110, exits the boiler outlet flue 100 via the discharge ends 122 of compartments 120. The cross-sectional flow areas of the conduits 110 and the compartments 120 are therefore preferably equal in order to minimize pressure drop. Conduits 110 and compartments 120 are preferably trapezoidal in shape and have a rectangular cross-sectional flow area.

Figure 4:
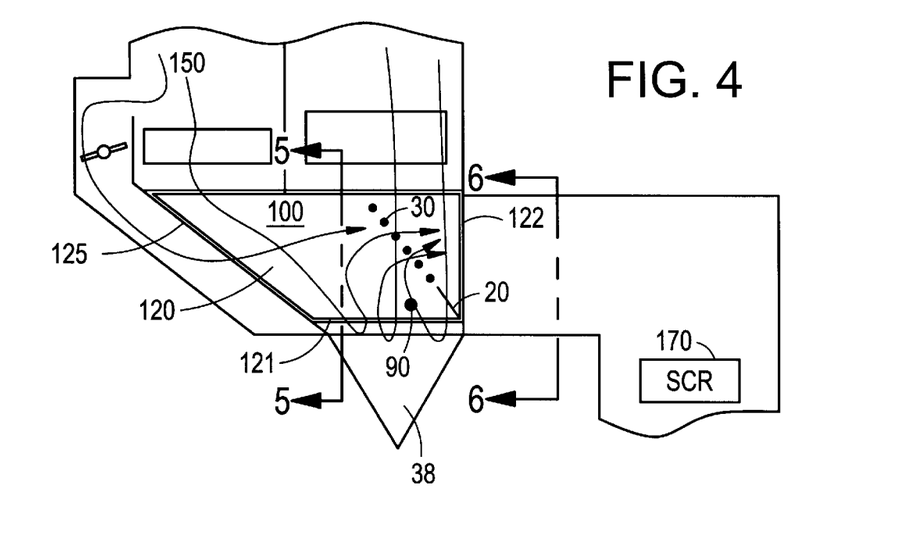
FIG. 4 is a sectional side view of a boiler outlet flue having a compartmented flow path for an SCR according to an embodiment of the invention wherein ammonia is injected into the compartments.
Figure 6:
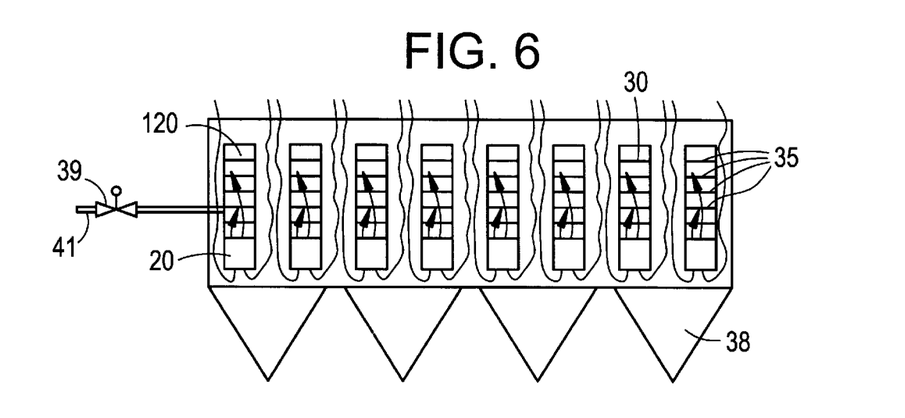
FIG. 6 is a rear elevation view downstream of a boiler outlet flue for an SCR according to an embodiment of the invention wherein ammonia is injected into the compartments.

In one embodiment, shown in FIGS. 4–6, ammonia supply system 30 injects ammonia into flowing flue gas 150 within each compartment 120. The ammonia reacts with the $NO_x$ in the flowing flue gas 150 as it travels through SCR reactor catalyst bed 170. Compartments 120 thus serve to isolate the ammonia injected into flowing flue gas 150 until it arrives at, or is just upstream of, SCR reactor catalyst bed 170 (as shown in FIG. 4). This allows one to know with a high degree of certainty that the ammonia injected into each compartment 120 will be directed to a specific location across the cross-section of SCR reactor catalyst bed 170. This provides for more precise control of the ammonia-to-$NO_x$ mole ratio distribution at the inlet of SCR reactor catalyst bed 170 and significantly facilitates reactor adjustment, thereby improving $NO_x$ removal efficiency. By providing individual compartments 120 more precise reactor control is possible. The greater the number of compartments 120, the greater the control precision.

Providing individual compartments 120, each having a smaller cross sectional area than boiler outlet flue 100 as a whole, conditions the flue gas more efficiently in terms of the distance traveled and/or pressure drop experienced as compared to a single flow path spanning the entire boiler outlet flue 100.

Gas resistance or pressure drop provided by SCR bed 170 has a flow redistribution effect that improves gas flow uniformity as the flue gas approaches the face of SCR bed 170. Terminating compartments 120 in close proximity to the face of SCR bed 170, minimizes or eliminates fluid interaction among the various streams as they leave compartments. Under these conditions, the flow corrective capability of the gas flow resistance of SCR bed 170 therefore improves the overall gas flow uniformity prior to injection via ammonia supply system 30, where it is known to be useful in establishing more uniform dosing of ammonia into the gas stream.

As shown in FIGS. 4 and 6 a compartment 120 may have an optional flow diverter plate 20 at intake end 121. Plate 20 can be used to direct the flowing flue gas 150 through the ammonia supply system 30. When used, plate 20 also acts to condition the flue gas flow pattern within the compartment creating a more uniform flue gas velocity profile across the compartment, thus helping to improve the uniformity with which ammonia is injected into the flowing flue gas 150. The plate 20 may be recessed at an angle from intake end 121.

As shown in FIG. 4, compartment 120 may have an opening 125 opposite discharge end 122 to receive flowing flue gas 150 by-passed directly from the convection pass in order to maintain the temperature of flowing flue gas 150 supplied to the SCR at low boiler loads.

Referring to FIGS. 4 and 6, an ammonia supply system 30 having a supply pipe 41, such as an ammonia injection grid (AIG) having sparger pipes 35, is positioned downstream of the intake end 121. Ammonia supply system 30 provides ammonia to the flue gas, and the ammonia reacts with the $NO_x$ in the flue gas as it travels through SCR reactor catalyst bed 170. Control valve 39 in supply pipe 41 can be used to variably adjust the flow rate of the ammonia into individual compartments 120, or groups of compartments.

Following the ammonia supply system 30, optional static mixing devices (not shown) such as static mixing tabs, can be used to improve mixing within compartment 120. An optional flow straightening device (not shown), such as a tube bundle, may be positioned at the end of compartment 120 for additional flow straightening.

Referring again to FIG. 4, NOx measurement means 90 can be located within one or more compartments 120 to measure or indicate the NOx concentration, for ammonia supply feed control feedback.

Where the catalyst bed properties contribute to different pressure drops across the SCR reactor catalyst bed 170, the flow area of compartments 120 can be adjusted to also have non-uniform pressure drops to correct the overall pressure drop profile in order to facilitate a more uniform flow profile across the SCR reactor catalyst bed 170.

As shown in FIGS. 4–6, existing hoppers 38, are disposed at the bottom of the existing boiler outlet flue for collecting particulate material entrained in the flue gas. As the flue gas flow changes direction at the bottom of the flue, particulate material such as flyash drops out of the flue gas stream into hoppers 38.

Figure 7:
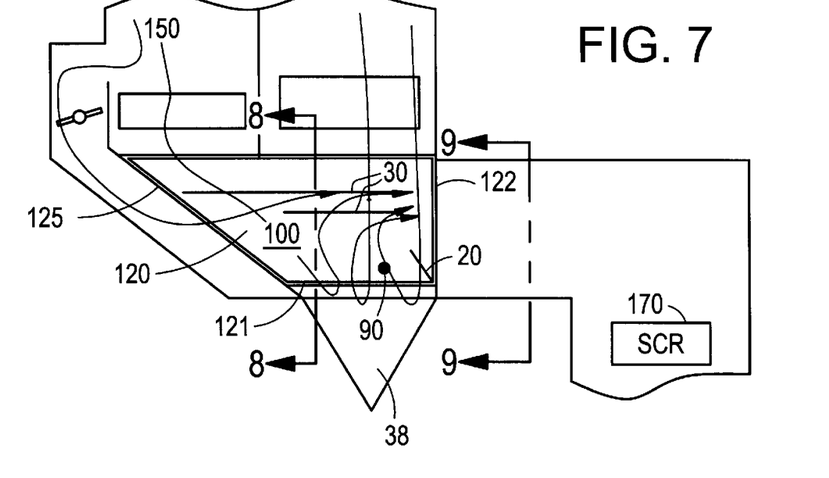
FIG. 7 is a sectional side view of a boiler outlet flue having a compartmented flow path for an SCR according to an embodiment of the invention invention wherein ammonia is injected into the conduits between the compartments.
Figure 9:
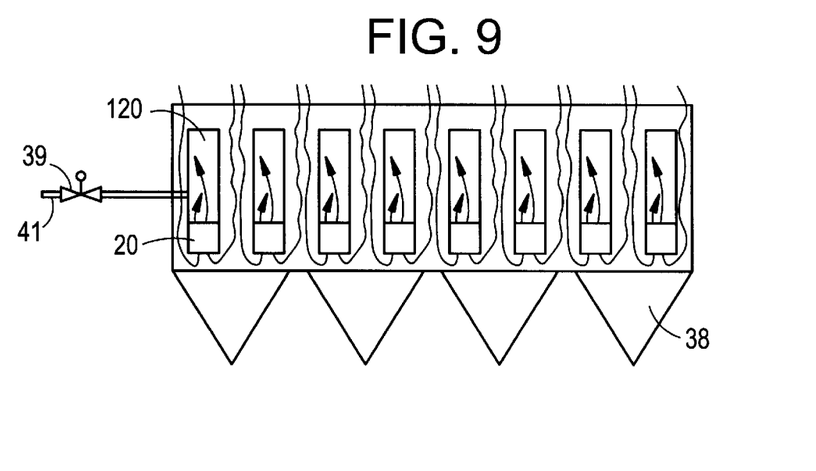
FIG. 9 is a rear elevation view downstream of a boiler outlet flue for an SCR according to an embodiment of the invention wherein ammonia is injected into the conduits between the compartments.
Figure 10:
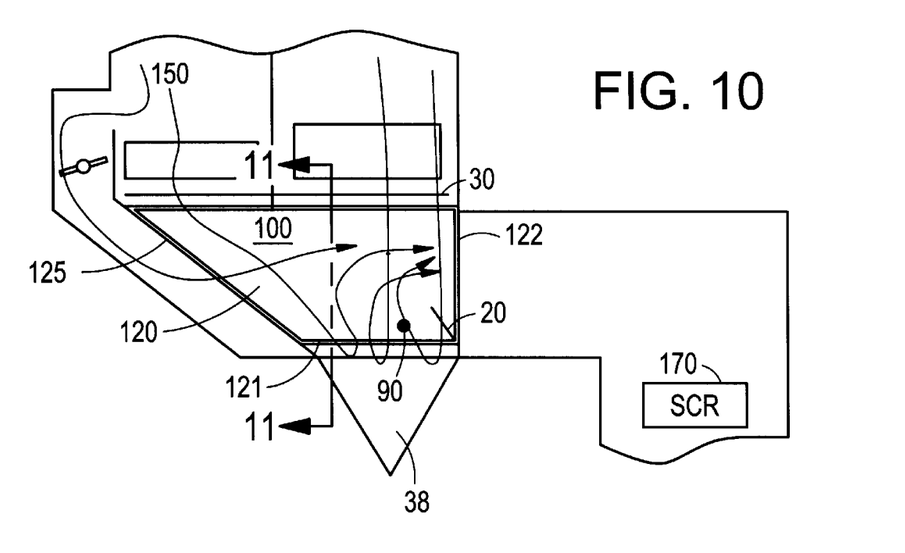
FIG. 10 is a sectional side view of a boiler outlet flue having a compartmented flow path for an SCR according to an embodiment of the invention wherein ammonia is injected into the flue gas stream upstream of the compartments.

While a specific embodiment of the invention has been shown and described in detail to illustrate the application of the principles of the invention, it will be understood that the invention may be embodied otherwise without departing from such principles. For example, while FIGS. 4–6 show ammonia supply system 30 injecting ammonia within the compartments 120 of the boiler outlet flue 100, ammonia supply system 30 may deliver ammonia at other points between the inlet and outlet of boiler outlet flue 100, such as within the conduits 110, as shown FIGS. 7–9, or upstream of the inlets 111 of conduits 110, as shown in FIGS. 10 and 11.

I claim:

1. A flue having gas flow characteristics for supplying a flue gas flow with particulate material entrained therein to a selective catalytic reduction reactor, comprising:

a plurality of conduits, each said conduit having an inlet for receiving the flue gas flow and an outlet for emitting the flue gas flow;

a plurality of compartments, each compartment being adjacent at least one of the plurality of conduits, each compartment having an intake end positioned in flow communication with the outlet of each said conduit, wherein the intake end of each compartment and the outlet end of each conduit are positioned on the same horizontal plane;

means for supplying ammonia into flue gas flow;

hoppers disposed at the bottom of the flue for collecting particulate material entrained in the gas; and a discharge end for discharging the flue gas flow proximate the selective catalytic reduction reactor.

2. The flue of claim 1, wherein the means for supplying ammonia injects ammonia into the flue gas flow within the compartments.

3. The flue of claim 2, wherein the means for supplying the ammonia comprises an ammonia injection grid disposed within each said compartment.

4. The flue of claim 1, wherein the means for supplying ammonia injects ammonia into the flue gas flow within each said conduit.

5. The flue of claim 1, wherein the means for supplying ammonia injects ammonia into the flue gas flow upstream of the inlets of the plurality of conduits.

6. The flue of claim 1, further comprising means for measuring NOx concentration within at least one compartment.

7. The flue of claim 6, further comprising means for controlling the amount of ammonia supplied to two or more compartments.

8. The flue of claim 7 wherein the means for controlling the amount of ammonia supplied to the two or more compartments comprises a control valve.

9. The flue of claim 1, wherein each said compartment terminates proximate the selective catalytic reduction reactor.

10. The flue of claim 1, wherein the inlet and the outlet of each said conduit have a same longitudinal axis.

11. The flue of claim 1, wherein the intake end of each said compartment and the discharge end of each said compartment are oriented generally perpendicular to one another.

12. The flue of claim 1, wherein the plurality of conduits have a rectangular cross sectional flow area.

13. The flue of claim 1, wherein each said conduit and each said compartment have approximately the same cross sectional flow area.

14. The flue of claim 13, wherein the plurality of compartments are trapezoidal in shape and have a rectangular cross sectional flow area.

15. The flue of claim 14, further comprising means for measuring NOx concentration within at least one compartment.

16. The flue of claim 15, further comprising means for controlling the amount of ammonia supplied to two or more compartments.

17. The flue of claim 1, further comprising a barrier wall disposed between each said adjacent conduit and compartment.

18. The flue of claim 1, further comprising flow conditioning means within two or more compartments.

19. The flue of claim 18, wherein the conditioning means comprises at least one plate disposed proximate the outlet end of the two or more compartments.

20. The flue of claim 1, wherein the conduits and the compartments are disposed side-by-side on the same horizontal plane and in an alternating sequence.

21. A flue having flue gas flow characteristics for supplying a flue gas flow with particulate material entrained therein to a selective catalytic reduction reactor, comprising:

a plurality of conduits, each said conduit having an inlet for receiving the flue gas flow and an outlet for emitting the flue gas flow, the inlet and the outlet of each said conduit having the same longitudinal axis;

a plurality of compartments, wherein each compartment is located adjacent at least one of the plurality of conduits, each compartment is trapezoidal in shape, and each compartment has a rectangular cross sectional flow area, each compartment further having an intake end positioned in flow communication with and on the same horizontal plane as the outlet of the adjacent conduit, and each compartment having a discharge end for discharging the flue gas flow proximate the selective catalytic reduction reactor, the intake end of each compartment and the discharge end of each compartment being oriented generally perpendicular to one another, and wherein each said conduit and each said compartment have approximately the same cross sectional flow area;

means for supplying ammonia into flue gas flow;

means for measuring NOx concentration within at least one compartment; and hoppers disposed at the bottom of the flue for collecting particulate material entrained in the gas.

22. A method for improving the gas flow characteristics of a flue gas flow supplied to a selective catalytic reduction reactor and having particulate material entrained therein, comprising:

providing a plurality of conduits, each said conduit having an inlet for receiving the flue gas flow and an outlet for emitting the flue gas flow, the inlet and the outlet of each said conduit having the same longitudinal axis;

providing a plurality of compartments, wherein each compartment is located adjacent at least one of the plurality of conduits, each compartment is trapezoidal in shape, and each compartment has a rectangular cross sectional flow area, each compartment further having an intake end positioned in flow communication with and on the same horizontal plane as the outlet of the adjacent conduit, each compartment having a discharge end for discharging the flue gas flow proximate the selective catalytic reduction reactor, the intake end of each compartment and the discharge end of each compartment being oriented generally perpendicular to one another, wherein each said conduit and each said compartment have approximately the same cross sectional flow area;

measuring NOx concentration within at least one compartment;

supplying ammonia into the flue gas flow in response to the NOx concentration measured within at least one compartment; and providing hoppers disposed at the bottom of the flue for collecting particulate material entrained in the gas.

* * * * *